United States Patent [19]
Brooks et al.

[11] 3,872,379
[45] Mar. 18, 1975

[54] EDDY CURRENT TESTING APPARATUS USING SLOTTED MONOTURN CONDUCTIVE MEMBERS

[75] Inventors: Robert A. Brooks, Rye, N.Y.; John Paul Wallace, Fort Defiance, Va.

[73] Assignee: Magnetic Analysis Corporation, Mount Vernon, N.Y.

[22] Filed: Aug. 29, 1973

[21] Appl. No.: 392,509

[52] U.S. Cl. .................................... 324/40, 324/37
[51] Int. Cl. ............................................. G01r 33/14
[58] Field of Search ............................... 324/40, 37

[56] References Cited
UNITED STATES PATENTS

| 2,467,306 | 4/1949 | Habig | 324/40 |
| 3,361,960 | 1/1968 | Renken, Jr. et al. | 324/40 |
| 3,694,735 | 9/1972 | Mester | 324/40 |
| 3,723,860 | 3/1973 | Lovlya et al. | 324/37 |

FOREIGN PATENTS OR APPLICATIONS

| 991,890 | 5/1965 | Great Britain | 324/40 |
| 219,218 | 3/1969 | U.S.S.R. | 324/40 |
| 249,723 | 6/1970 | U.S.S.R. | 324/40 |

OTHER PUBLICATIONS

Kim et al., Flux Concentrator for High–Intensity Pulsed Magnetic Fields, The Review of Scientific Instruments, 7/59, pp. 524–533.
High Magnetic Fields, Proceedings of the International Conference on High Magnetic Fields, 1961, MIT Press and John Wiley & Sons, Inc. 1962, Chapters 22, 23, 24, pp. 235–268.

*Primary Examiner*—Stanley T. Krawczewicz
*Attorney, Agent, or Firm*—Pennie & Edmonds

[57] ABSTRACT

One or more monoturn conductive members are employed having an inner aperture and an encircling surface with a slot extending from the aperture to the encircling surface. An encircling coil supplied with alternating or pulsed current produces current flow around the inner surface of the aperture and thereby produces a magnetic field to induce eddy currents in an object located in the aperture. Variations in the eddy currents are detected and indicated. Greater flux densities for a given coil and current, lower coil inductance and short magnetic fields can be produced. A detector coil may encircle a monoturn member. A pair of monoturn members with encircling coils may be used in null-type instruments, and more than two may be employed if desired. Arrangements for testing hot objects and objects of noncircular cross-section are described, and also coil assemblies usable with different monoturn members having different aperture size or shape.

22 Claims, 21 Drawing Figures

PATENTED MAR 18 1975 3,872,379
SHEET 1 OF 4
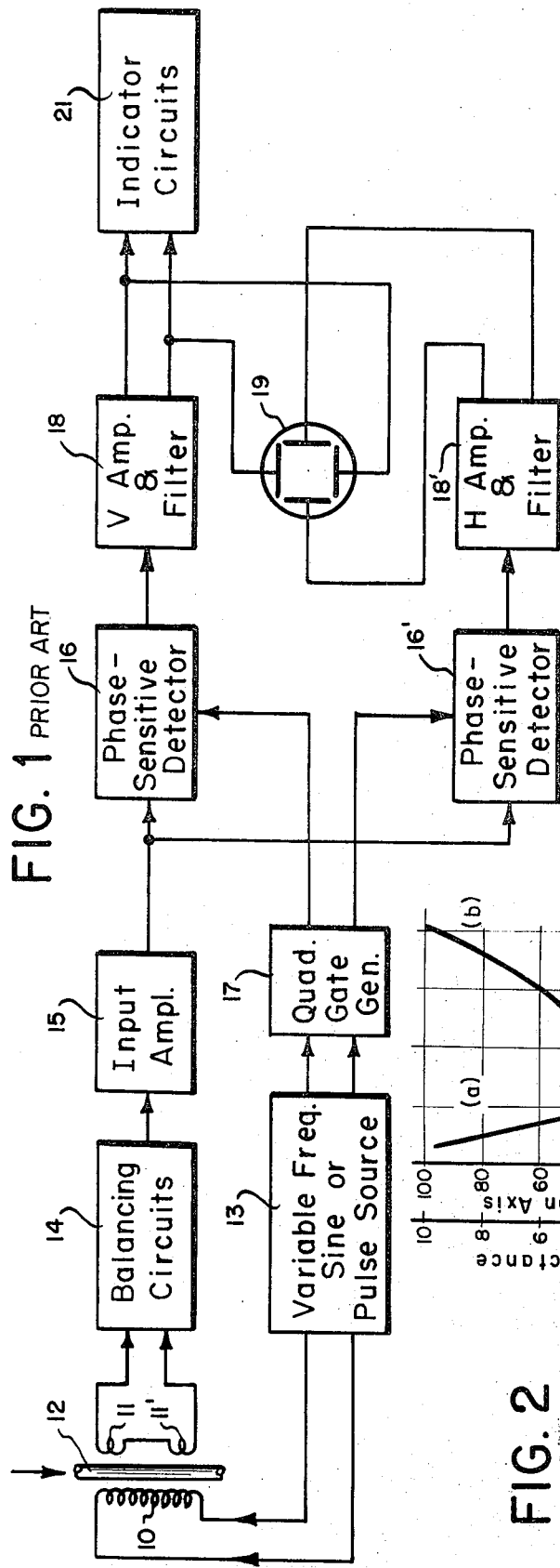
FIG. 1 PRIOR ART
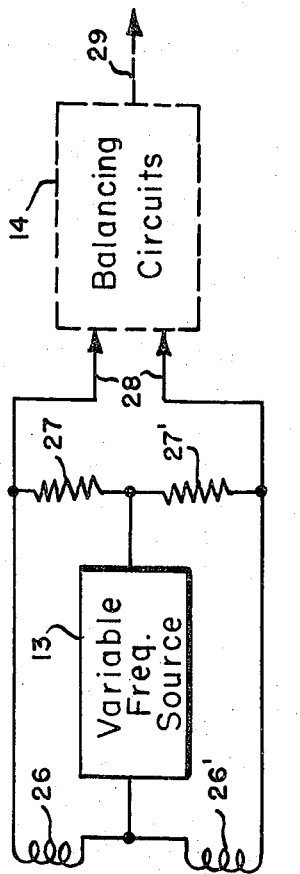
FIG. 3 PRIOR ART
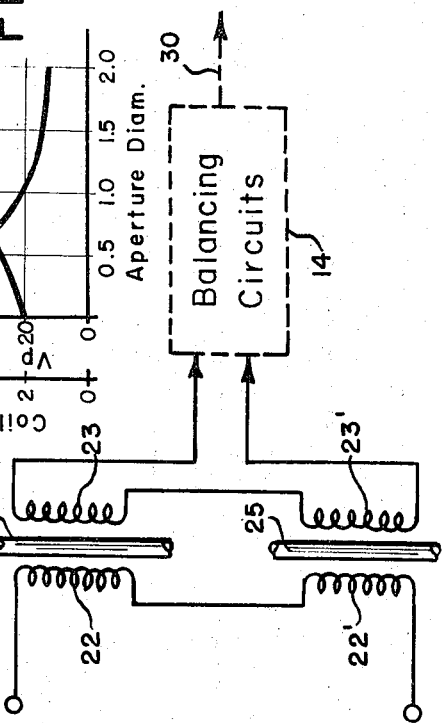
FIG. 4c
FIG. 2 PRIOR ART

EDDY CURRENT TESTING APPARATUS USING SLOTTED MONOTURN CONDUCTIVE MEMBERS

BACKGROUND OF THE INVENTION

Eddy current testing apparatus is well-known, and is useful for the non-destructive testing of conductive objects to determine defects or flaws therein. In many cases a coil assembly is employed which encircles the object under test, and is energized to induce eddy currents in the object which vary in amplitude and/or phase with defects or flaws in the object. Means responsive to such variations are then used to indicate the defects or flaws. Energizing AC voltages in the form of sine or square waves have been employed in produce a flow of alternating current in the coil assembly, and DC pulses have also been employed.

Various types of coil assemblies have been used, depending on the particular application. Frequently a primary coil and a pair of spaced detector coils connected in null configuration are employed in flaw detectors, with the detector coils encircled by or closely adjacent the primary coil. Operation at different alternating frequencies or pulse recurrence frequencies (PRF's) is often required to detect subsurface as well as surface flaws, or I.D. as well as O.D. flaws in tubes. In general lower frequencies and longer pulses penetrate deeper into conductive objects than higher frequencies or shorter pulses. For detecting small surface flaws, high frequencies such as 67–600 KHz have been employed and magnetic fields of short length are desirable. In one coil assembly used in practice, the primary coil is provided with aluminum shields at the ends of the coil and extending between the coil and the object to be tested with a small gap therebetween. At high frequencies most of the flux is confined to the gap, thereby limiting the length of the magnetic field. The detector coils are located in or closely adjacent the ends of the gap, between the shields and the object. Although successful, the shields introduce losses which increase with frequency, and hence reduce the sensitivity of the apparatus.

In comparator instruments separate pairs of primary and detector coils may be employed, with the object under test placed in one pair and a reference object placed in another pair, and the detector coils connected in null configuration. Instead of separate primary and detector coils, a pair of coils driven in a bridge configuration may be employed.

It is also possible to employ a single encircling coil and utilize changes in the coil impedance due to the eddy current variations to indicate deflects or flaws.

Usually such coil assemblies are designed to closely encircle the object under test so as to promote sensitivity. If other than cylindrical objects are to be tested, the coils may need to be shaped to suit the object cross-section, in order to maintain adequate sensitivity to flaws on any portion of the object periphery.

In order to test hot objects such as hot-rolled bars and tubes, the coil assembly must be capable of withstanding the high temperatures involved, without excessive change in operating characteristics or deterioration. This may be difficult in practice and subject to limitations in the range of temperatures of objects which can be tested adequately.

Commonly the presence of conductive material between the coils and the object in the test region is avoided so as not to reduce sensitivity to defects or flaws, particularly at higher test frequencies. It has, however, been suggested in U.S. Pat. No. 3,694,735 to use a thin cylinder of heat-resistant material such as ceramic or high temperature metal around which primary and sensing coils are wound, in a water-cooled assembly. If of metal, it is stated that sensitivity is reduced because of eddy currents flowing within the cylinder, and the cylinder is preferably longitudinally slotted and the slot filled with ceramic so that no eddy currents will flow in the cylinder and the sensitivity will be improved.

In U.S. Pat. No. 3,361,960 a coil assembly is described in which a pulse energized transmitting coil is placed in the aperture between two cylindrical copper shields having frustum-shaped ends, and one or two detector coils coaxial with the transmitting coil on one or both sides thereof are shielded therefrom by the ends of the frustums. Subsurface defects are said to be detectable by reflections of the pulsed fields from the transmitting coil.

It has heretofore been suggested to produce a high intensity magnetic field for heat treating metal parts, such as surface hardening, by using a radially split conductive member encircled by a coil and having an aperture therein in which the part to be treated is placed. By applying alternating current to the coil, a high intensity magnetic field is produced in the aperture for treating the part. Similar arrangements have been described for producing high transient magnetic fields by applying a high power pulse to the coil, and fields in the range of hundreds of kilogausses have been described. A suggested use of such high pulsed magnetic fields has been to test the strength of conductors by deformation. The required high current tends to deform the energizing coil, and the mechanical strength of the radially split member helps to avoid such deformation, albeit at the disadvantage of less efficiency than with a coil alone.

Such arrangements are for producing magnetic fields of far higher intensity than those employed in non-destructive eddy current testing, and prior experience in the field of non-destructive eddy current testing would indicate that the considerable mass of conductive material between the coil and the object would be undesirable.

It has now been found that such an arrangement in combination with suitable detecting and indicating means can be used to advantage in non-destructive eddy current testing apparatus. Preferably a combination of a plurality of slotted members and/or coils, not suggested in the foregoing, are employed.

SUMMARY OF THE INVENTION

In accordance with the invention, one or more slotted conductive members are employed having an inner aperture for receiving an object to be tested and a surface encircling the aperture and spaced therefrom. The slot extends from the aperture to the encircling surface. A coil encircles the aforesaid encircling surface and is supplied with alternating or pulsed current. As will be explained more fully hereinafter, the encircling coil induces a current in the adjacent surface which flows down one side of the slot, around the surface of the aperture, and up the other side of the slot. The current flow around the surface of the aperture produces a magnetic field in and adjacent the aperture as though it were a directly energized single turn coil. Hence the slotted conductive member is termed a "monoturn" member.

It has been found that when alternating or pulsed current is supplied to the coil encircling such a slotted monoturn member, eddy currents are induced in an object located in the aperture of the member which vary with variations in the object, and that such eddy current variations may be detected by suitable circuit means and used to indicate variations in the object under test. The variations in the object may be flaws, variations in dimensions, variations in chemical, physical and metallurgical properties, etc.

A slotted monoturn member with a single encircling coil may be useful in some applications. Preferably, however, two or more coils are employed. Thus it has been found that the eddy current variations may be detected by a pair of axially-spaced coils closely encircling the object in or near the aperture of a monoturn member energized by an encircling primary coil. Furthermore, it has been found that eddy current variations may be detected by a slotted monoturn member encircled by a detector coil, preferably a pair of such members and detector coils, and that both a primary coil and a detector coil can be wound around the same slotted monoturn member. Thus monoturn members may be used not only to produce magnetic fields which induce eddy currents in an object under test, but also to respond to changes in the magnetic field produced by variations in the eddy currents in the object. A number of different embodiments are described hereinafter.

A number of advantages accrue from the use of slotted monoturn members, depending upon the particular arrangement employed. With an encircling primary coil of given diameter and ampere turns, a considerable increase in flux density can be obtained in the aperture as the aperture diameter is decreased. Also, the coil inductance decreases substantially, so that more current can be supplied thereto without an excessively expensive generator, particularly at higher frequencies. The length of the aperture can also be small compared to the distance from the center of the aperture to the encircling surface, so that a short magnetic field can be obtained with a comparatively large coil diameter.

It is also possible to employ a slotted monoturn member in which the radial cross-section is T-shaped or tapered so that the axial length of the encircling surface is greater than that of the aperture, thereby enabling longer coils with larger diameter wire to be employed without increasing the length of the magnetic field produced by current around the aperture. Thus increased sensitivity over conventional coil assemblies can be obtained at high frequencies while maintaining short magnetic fields.

It is also feasible to use a coil assembly of given diameter with slotted monoturn members having different size apertures, thereby facilitating production of a range of assemblies to test different size objects. Further, the apertures need not be circular, but may be shaped to accommodate different shaped objects while still using circular encircling coils.

With both primary and detector coils encircling the slotted monoturn members, hot objects may be tested without damaging the coils or seriously affecting their electrical characteristics, and water cooling can be employed if desired. Also, the assemblies may be made more rugged than conventional assemblies.

Other advantages will in part be pointed out in the following description of detailed embodiments, and in part be clear therefrom.

BRIEF DESCRIPTION OF THE DRAWINGS

FIG. 1 is a block diagram of one form of an eddy current flaw detector;

FIG. 2 illustrates one form of coil arrangement suitable for a comparator;

FIG. 3 illustrates a bridge arrangement for energizing a pair of coils usable in either a comparator or a flaw detector;

DESCRIPTION OF THE SPECIFIC EMBODIMENTS

Figure 4A:
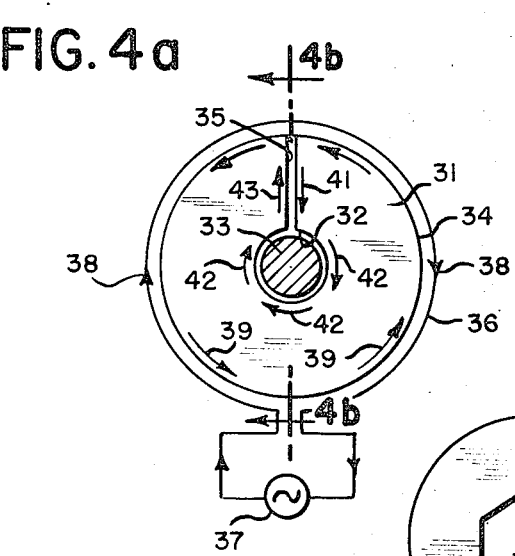
FIG. 4a is an end view and FIG. 4b a cross-section along line 4b—4b of a single slotted monoturn conductive member and encircling coil illustrating certain principles of operation utilized in the invention, and usable in certain forms of eddy current testing apparatus.

Referring to FIG. 1, an example of a known type of flaw detector is shown. A test coil assembly comprises a primary coil 10 and a pair of detector coils 11, 11' connected in opposition to form a null arrangement. The coils normally are coaxial and an object 12 to be tested is fed coaxially through the coils. The primary coil 10 is supplied with energizing current from source 13 which may be either a source of sine waves or a source of pulses, as desired. Usually different sine wave frequencies or different PRF's (pulse recurrence frequencies) are provided to facilitate detection of flaws or defects at different depths in the object 12, and O.D. and I.D. flaws in a tube.

Current in the primary coil 10 induces eddy currents in object 12 which vary with variations in the object due to defects or flaws therein. In the absence of defects or flaws, the signal output of the null detector coils 11, 11' will be approximately zero. Balancing circuits 14 may be employed, if necessary, to yield as small a null output as required. When a defect or flaw appears, the signals in coils 11, 11' become unbalanced, yielding signal outputs which vary in phase and/or amplitude. The outputs are amplified in 15 and supplied to phase-sensitive detectors 16, 16'. Suitable quadrature gating signals are produced in 17 from the signals from source 13, and supplied to the detectors. Thus the detector outputs are quadrature related. The quadrature outputs are amplified and filtered in 18, 18' and supplied to the vertical and horizontal deflecting plates of the cathode-ray oscilloscope 19 for display. One or both outputs, here the vertical component, may be supplied to indicating circuits 21 such as a chart recorder, threshold circuit for marking or sorting, etc. Many variations are possible and additional features may be provided, as required for the contemplated use.

FIG. 2 shows a coil arrangement suitable for a comparator. Here a pair of primary coils 22, 22' with associated detector coils 23, 23' are provided for comparing an object 24 under test with a known object 25 and indicating variations therebetween. The primary coils may be connected in series or parallel, and supplied with energizing alternating or pulsed current from a suitable source such as 13 in FIG. 1. The detector coils 23, 23' may be connected in a null configuration, and the output supplied through balancing circuits 14 (if required) to output line 30. Subsequent processing may be as in FIG. 1. Simpler processing circuits may be used if desired. Objects of different size, but otherwise free of defects or flaws, may be separated, and it will be understood that the term "variations" includes such an operation.

Instead of using separate primary and detector coils, single coils in a bridge arrangement may be used in either of the above-described apparatus. FIG. 3 shows two coils 26, 26' and two resistors 27, 27' in a bridge configuration. Energizing source 13 is connected across one diagonal of the bridge, and signal output leads 28 are connected across the other diagonal. Balancing circuits 14 may be used if necessary to initially balance the bridge. In the presence of defects or flaws, or other variations in an object or objects within coils 26, 26' (not shown), the resulting change in impedance of the coils will unbalance the bridge and produce output signals in line 29. These may be processed as above described. Instead of resistors 27, 27', a balanced transformer could be employed, as is known in the art.

Other forms of eddy current testing apparatus are known but not specifically illustrated. Thus a single coil may be employed in a multi-frequency testing apparatus as disclosed in U.S. Pat. No. 3,135,914 to Callan et al. Also, instead of using pairs of coils to generate separate signals for comparison as in FIGS. 1–3, the output of a single coil could be compared with a separately generated reference signal.

Figure 4B:
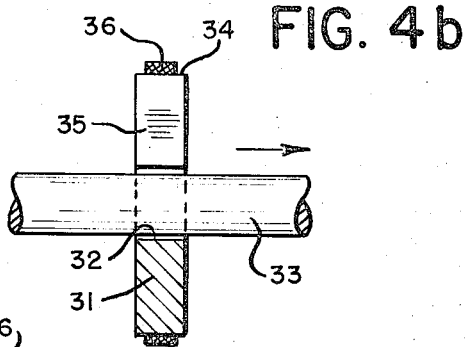
FIG. 4c shows illustrative curves.

Referring now to FIGS. 4a and 4b, a conductive member 31 has an inner aperture 32 for receiving an object 33 to be tested, and a surface 34 encircles the aperture and is spaced therefrom. A slot 35 extends from the aperture 32 to the encircling surface 34. A coil 36 encircles surface 34, and may be a single layer coil of the desired number of turns. In FIG. 4a the coil is shown as a single turn for convenience of explanation.

When an alternating or pulsed current is supplied to coil 36, as by generator 37, at a given instant the current will flow clockwise as shown by the arrows 38. This will induce a corresponding eddy current in and near the surface 34 of the conductive member, but in the opposite direction, as indicated by arrows 39. The depth of penetration will depend on frequency and conductivity, in accordance with skin depth considerations. When the current in the conductive member reaches slot 35, it cannot flow thereacross and accordingly flows down one side of the slot (arrow 41), around the surface of the aperture (arrows 42), and up the other side of the slot (arrow 43).

Member 31 is made of high electrically conductive material such as copper or aluminum, so as to keep losses low. Accordingly the current flow around the surface of the aperture is the same as that around surface 34, and produces a field in and adjacent the aperture as though it were a directly energized single turn coil. Hence the slotted conductive member is termed a "monoturn" member. In effect, the monoturn transforms the coil wound around the circumference into one which has an effective diameter equal to the diameter of the aperture. The magnetic field thus produced induces eddy currents in object 33 which flow around the object opposite in direction to arrows 42. The current flow at slot 35 is in opposite direction on the two walls thereof, so that the field therebetween is substantially zero and can be disregarded.

Analysis indicates, and experiment confirms, that the flux density within the aperture 32 and adjacent thereto is much the same as that of a coil having the same length and diameter as the aperture, and the same number of ampere-turns as coil 36. Some losses occur, so that high conductivity is desired in the slotted member. However, with a coil 36 of given diameter closely encircling the slotted member, considerable increase in the flux density in the aperture can be obtained as the aperture diameter is decreased. Also the coil inductance decreases substantially as the aperture diameter is decreased.

FIG. 4c shows illustrative curves for monoturn members 31 of aluminum having an O.D. of 2 inches with a coil 36 would therearound, and various diameter apertures. A probe coil was inserted on the axis of the aperture and the maximum voltage recorded, thus giving a relative indication of the variations in magnetic flux density with aperture size. A constant current was maintained in the coil and the apparent coil inductance measured. Curve (a) shows the variation in the flux density. At 2.0 inches (without the monoturn), a value of 13.2 millivolts was measured. For thin walled members only slight increases in flux density were measured. However with an aperture diameter of 1 inch (half the O.D.) a value of 20.4 was measured, indicating an increase in flux density of over 50%. For smaller apertures, the flux density increased rapidly. Curve (b) illustrates the change in apparent inductance of coil 36. With no monoturn, a value of 9.95 millihenries was measured, and the inductance decreased to a value of 2.18 millihenries for a 0.125 inch aperture diameter.

The curves of FIG. 4c may be expected to change depending on the particular parameters employed. Nevertheless they demonstrate results that can be obtained.

It has been found that defects or flaws in an object 33 which alter the eddy current flow therein can be sensed by coil 36. Thus a slotted monoturn member with an encircling coil as shown in FIG. 4 can be used for example in a multifrequency flaw detector such as described in U.S. Pat. No. 3,135,914 to Callan et al. and two such members may be used in the bridge configuration shown in FIG. 3, etc.

Figure 5A:
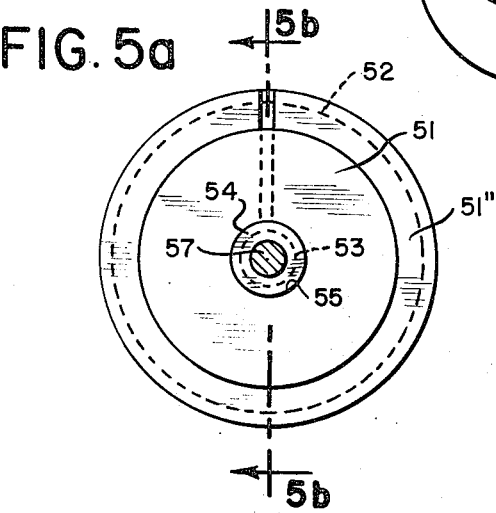
FIG. 5a is an end view and FIG. 5b a cross-section along line 5b—5b of an embodiment of the invention suitable for flaw detection.
Figure 5B:
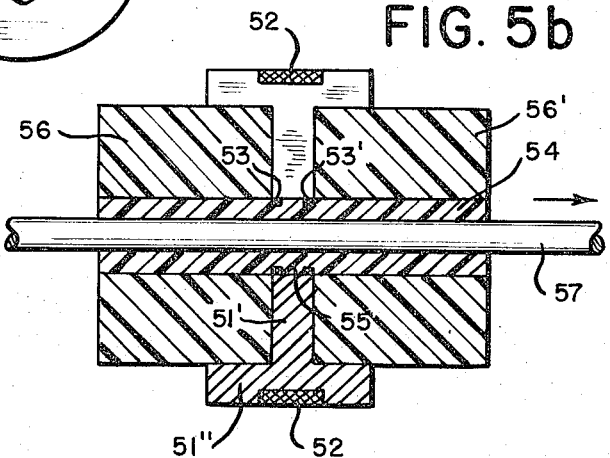

Referring to FIG. 5, an arrangement is shown which is designed for use in a flaw detector such as illustrated in FIG. 1. Here a slotted monoturn conductive member 51 is employed having a narrow web section 51' with a wider peripheral section 51'' in a T-shaped radial cross-sectional configuration. Primary coil 52 is wound in an annular groove of the peripheral section. A pair of axially-spaced detector coils 53, 53' are wound on a coil form 54 of insulating material. Here the diameter of 54 is the same as aperture 55 in the slotted member, and the detector coils are within the aperture. However, other arrangements are possible, and the detector coils may be placed outside the aperture and adjacent thereto, or partially inside and partially outside the aperture, as meets the requirements of a particular application. Cylindrical members 56, 56' of insulating material may be used to hold the slotted member and coil form in proper position.

By using a thin web, the length of aperture 55 and the magnetic field lengthwise of object 57 are kept quite short, thus facilitating the detection of small flaws. Also the primary coil 52 can be made longer than aperture 55 while preserving the short field at the aperture. Thus larger diameter wire can be used in coil 52 to carry more current, and the turns can be separated if desired to reduce the coil inductance. This is advantageous at higher frequencies, say of the order of 67–600 KHz, where a high coil impedance may make it difficult to supply sufficient current without undue expense.

In one embodiment designed for high frequency testing of tubing 0.234 inches in diameter, the slotted monoturn member had an aperture diameter of 0.302 inches and an outside diameter of one inch. The axial length of web 51' was 0.100 inches. The primary coil was 0.160 inches long and the detector coils 0.020 inches long and spaced 0.060 inches apart. At high frequencies of 67–600 KHz a substantial improvement in signal amplitude, of the order of 20 db, was obtained over a standard coil assembly using aluminum shields to limit the length of the magnetic field at these frequencies, and an overall substantial gain in sensitivity. The embodiment is not considered optimum, and is given only for illustrative purposes.

Figure 6C:
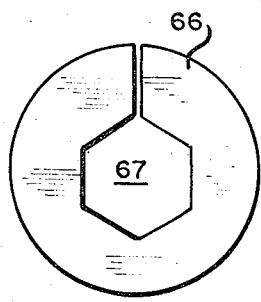
FIG. 6c illustrates a non-circular aperture in the slotted monoturn conductive member.
Figure 6A:
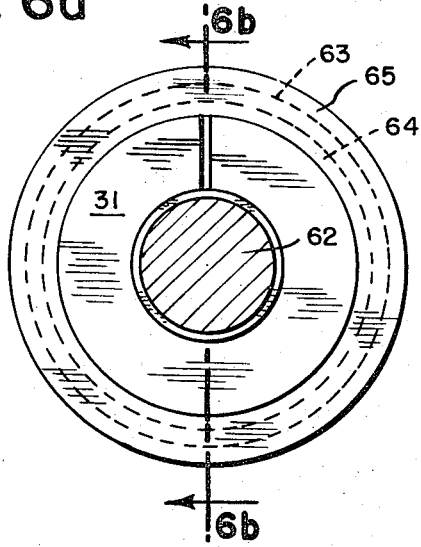
FIGS. 6a and 6b are similar views of another embodiment of the invention suitable for flaw detection.

It has also been found that slotted monoturn members can be used with detector coils, as well as with primary coils. FIG. 6 illustrates one such arrangement, designed for use in a flaw detector such as illustrated in FIG. 1. Here a pair of slotted monoturn members 31, 31' are employed, each similar to the member shown in FIG. 4. The members may be mounted on a thin tube 61 of insulating material, through which an object 62 passes. A primary coil 63 encircles both members 31 and 31', and produces respective magnetic fields in apertures 32, 32' thereof. Each slotted member is also encircled by a detector coil 64, 64'. A defect or flaw in object 62 will alter the eddy current flow in the object as it passes members 31 and 31' in succession. It has been found that variations in the eddy currents produce corresponding signals in detector coils 64, 64' which may then be processed to indicate the presence of the defects or flaws.

Coils 63, 64, 64' may be held in an annular member 65 of insulating material. With conventional coil assemblies it is usually necessary to provide a range of sizes to test objects of different diameter. Considerable winding precision is required in order to produce properly balanced assemblies. The arrangement of FIG. 6 allows the use of a single size coil assembly with slotted monoturn members having different size apertures, thereby facilitating the supply of assemblies to suit customer requirements. If desired, the coil assembly and monoturn members can be arranged for convenient replacement of the monoturn members with others having different apertures. Also, it is found that with slotted monoturn members, less precision in coil winding is required, thereby reducing manufacturing costs. Inasmuch as the inductances of detectors coils 64, 64' will depend in part on the aperture diameters, the inductances can be matched if desired by slightly enlarging one aperture with respect to the other.

Figure 6B:
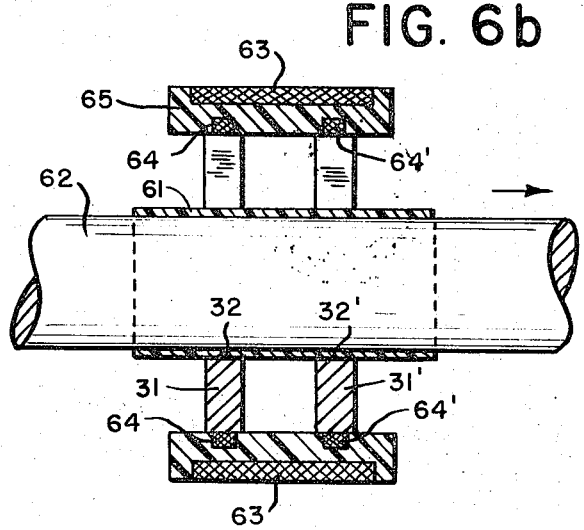

When the arrangement of FIG. 6b is used in the circuit of FIG. 1, detector coils 64, 64' are connected in series opposition to form a null configuration. Other null coil arrangements are known in which the monoturn members may be used. For example, a third monoturn may be placed between 31 and 31' with double the number of turns in its detector coil. Then all three coils may be connected in series, with coils 64, 64' in series aiding and the third coil in series opposition.

It should be noted that the apertures of the slotted monoturn members can be shaped to accommodate other than cylindrical objects. An example is shown in FIG. 6c where slotted monoturn member 66 has an hexagonal aperture 67 therein, to enable the testing of hexagonal stock. Irregular apertures are also feasible. In such case the current flow around the aperture remains close to the surface of the object to be tested at all points around the periphery of the object, so that uniform sensitivity regardless of the location of a flaw is promoted. The coils themselves, however, can be simple circular coils.

A considerable increase in ruggedness can also be obtained if the monoturn members are held together rigidly, such as by a non-conductive spacer member as described later in connection with FIGS. 9–16. Sometimes bar stock or tubes have burrs which cut into the coil assembly. With standard constructions the assembly may be ruined. However, it has been found that an indentation cut into the monoturn aperture may have little or no effect on performance and the assembly can continue in use.

Figure 10:
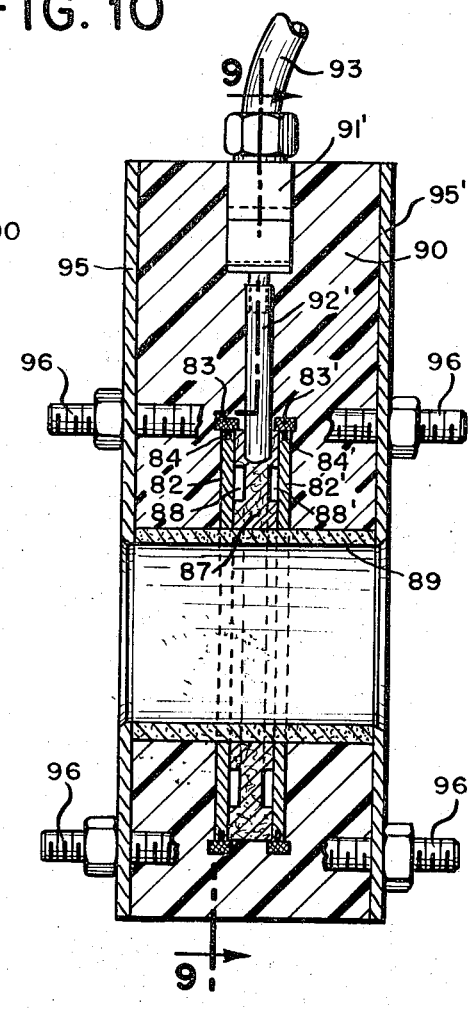
Figure 11:
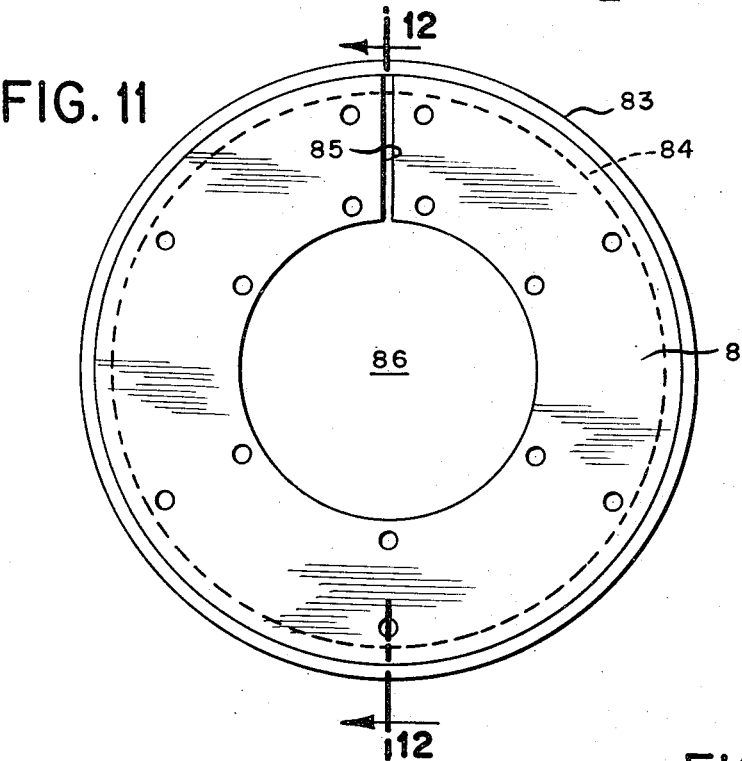
Figure 12:
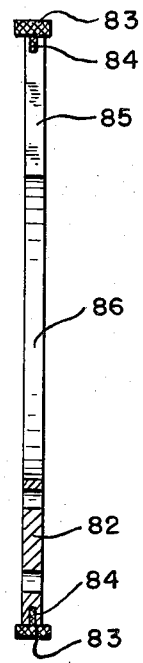

Although FIGS. 5 and 6 show arrangements particularly designed for a flaw detector such as illustrated in FIG. 1, they may be adapted for use in a comparator circuit such as illustrated in FIG. 2. Thus in FIG. 5 one of the detector coils 53, 53' may be eliminated and the other suitably positioned in or adjacent the aperture, and two such arrangements connected as in FIG. 2. Similarly, in FIG. 6 the two slotted monoturn members may be mounted in separate structures, and each provided with its own primary coil as shown in FIG. 10 described later. In comparators longer apertures may be desired for some uses, and the axial thickness of the slotted monoturn members may be chosen accordingly.

Figure 7:
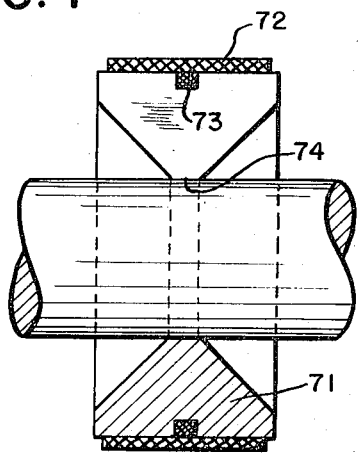
FIG. 7 illustrates a tapered form of the slotted monoturn conductive member.

FIG. 7 shows a slotted monoturn conductive member 71 having a tapered radial cross-section. Coil 72 encircles the member, and a detector coil 73 may be wound in a groove in the member. As in the case of FIG. 5b, this configuration permits using a coil 72 longer than the aperture 74, while maintaining an axially short magnetic field at the aperture. Present experiments indicate that the flux density along the axis of the aperture is somewhat more uniform within the aperture than with a T-shaped cross-section having the same length aperture, which may be useful in some applications.

Figure 8:
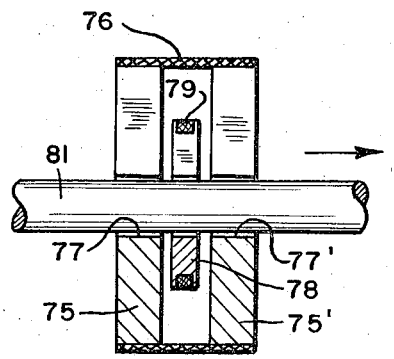
FIG. 8 illustrates the use of a plurality of slotted monoturn conductive members with associated coils.

FIG. 8 illustrates an assembly using two slotted monoturn members 75, 75' encircled by a primary coil 76 to create magnetic fields in the same direction in respective apertures 77, 77'. A detector slotted monoturn member 78 encircled by detector coil 79 is positioned between the primary monoturns. In the absence of variations in object 81, the detector coil will yield constant amplitude outputs which, upon subsequent detection, will yield a DC output which will be eliminated by the AC coupling normally used in the amplifier following the detector. A flaw in the object passing through the assembly will cause a variation in the eddy currents in the object which will produce a corresponding variation in the detector coil output which can be sensed in the processing circuits and indicated.

If desired, separate primary coils can be employed for primary members 75, 75' and connected in opposition to produce a null output in detector coil 79 in the absence of flaws, etc. Then a flaw will cause variations in eddy currents in the object which will be sensed by the detector coil. Or, two detector monoturn members with associated coils may be placed between the primary members 75, 75' and connected in null configuration.

The arrangement of FIG. 8 can be used in a comparator as well as a flaw detector, and adapted as required for the particular comparator circuits employed.

FIGS. 9–16 illustrate a flaw detector particularly designed for testing hot objects, for example rods or tubes as they issue from a rolling mill. Here the use of slotted monoturn members is particularly advantageous since they can easily be water cooled to prevent deterioration or serious change in electrical characteristics of the associated coils.

A pair of slotted monoturn members 82, 82' are encircled by respective primary coils 83, 83' which may be longer than the axial length of the monoturn members. The members are provided with peripheral grooves in which respective detector coils 84, 84' are wound. One of the members is separately shown in FIGS. 11, 12. The slot is shown at 85 and the inner aperture at 86. The two members are axially separated by a spacer member 87 shown in detail in FIGS. 13–16.

Member 87 is of insulating material such as fiber glass and is provided with annular grooves 88, 88' which, together with the abutting surfaces of the slotted members, form channels for the flow of cooling water.

Figure 9:
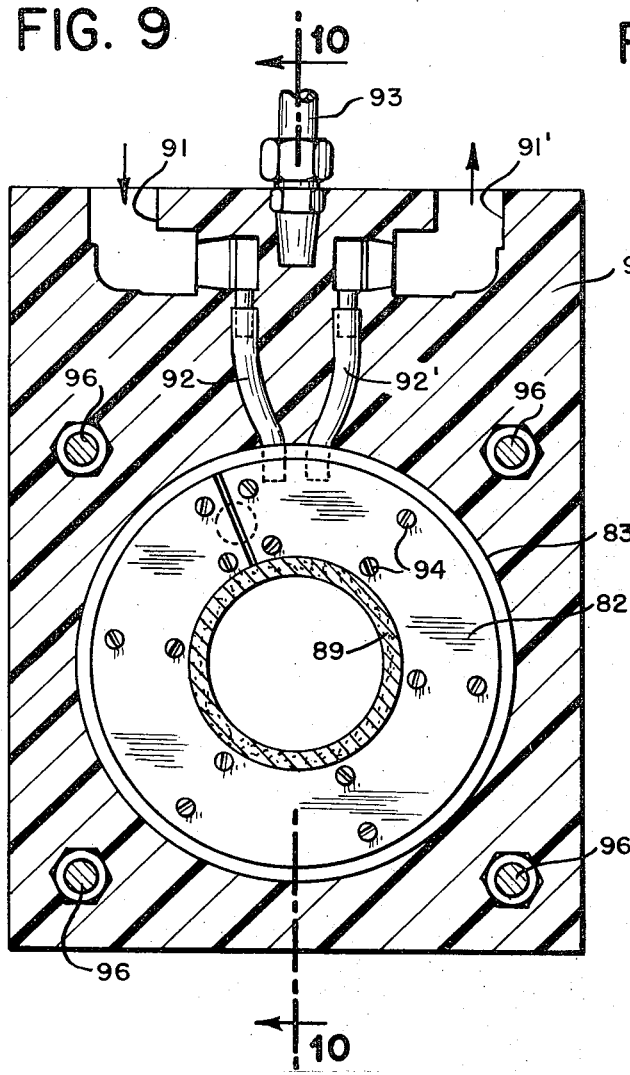
FIGS. 9–14 illustrate a water-cooled flaw detector in accordance with the invention, suitable for testing hot tubes or rods, various cross-sections being taken as indicated.

Referring to FIGS. 9 and 10 for the overall structure, a thin-walled tube 89 of suitable insulating material such as ceramic extends through the apertures and provides a passage for the object to be tested. Elbows 91, 91' and tubes 92, 92' form inlet and outlet connections for the cooling water. A fitting 93 is provided for leads to the coils on the monoturn members. The leads are not shown, to avoid unnecessary complexity. It suffices to say that the primary coils 83, 83' are connected in series aiding and the detector coils 84, 84' in series opposition, similar to the arrangement described in connection with FIG. 1. The internal assembly of slotted monoturn members 82, 82' and spacer 87 includes suitably positioned screws 94, and the complete assembly includes plates 95, 95' held together by suitably positioned bolts 96. After assembly, an insulating heat-conductive compound such as an epoxy compound may be introduced as indicated at 90.

Figure 13:
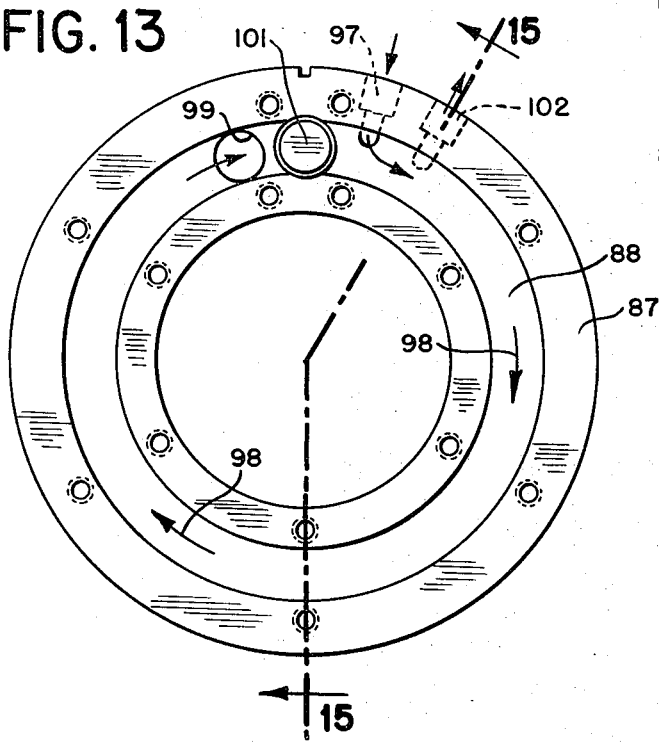
Figure 15:
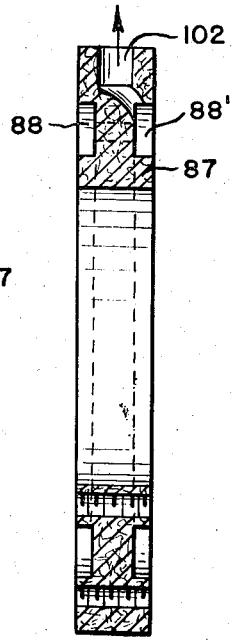
Figure 16:
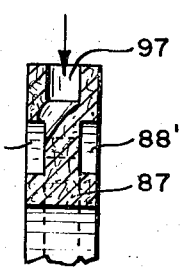
Figure 14:
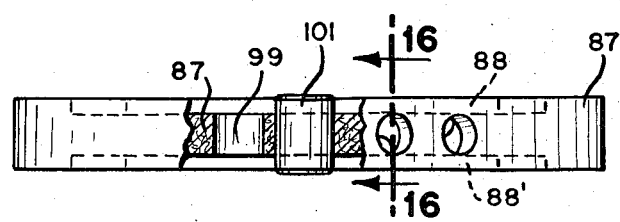

As best seen in FIG. 16, inlet tube 92 leads to a hole 97 in spacer 87 and thence to annular channel 88. Water flows around the channel clockwise, as indicated by arrows 98 in FIG. 13, to a hole 99 through spacer 87 which connects channel 88 with 88', as seen in FIGS. 13, 14. A plug 101 extends through channels 88, 88' to prevent flow of water thereby. Consequently water flows through hole 99 to channel 88' and around 88' counterclockwise to the outlet hole 102 (FIG. 15), and thence to outlet tube 92'.

In operation, alternating or pulsed current in primary coils 83, 83' produce eddy currents in an object (not here shown) in tube 89, and variations in the object produce signals in detector coils 84, 84' which are suitably processed for indication, for example as shown in FIG. 1.

The invention has been described in connection with a number of specific embodiments which illustrate different features, constructions and uses in eddy current testing. It will be understood that features of one embodiment may be used in others, and further changes are possible to suit the requirements of a particular application.

We claim:

1. Eddy current testing apparatus for the nondestructive testing of objects which comprises
   a. a monoturn conductive member having an inner aperture for receiving an object to be tested and a surface encircling the aperture and spaced therefrom,
   b. a slot in said member extending from said aperture to said encircling surface,
   c. a coil encircling said encircling surface for inducing current flow therein,
   d. means for supplying alternating or pulsed current to said coil,
   e. said monoturn conductive member being designed and adapted for producing current flow around the surface of said aperture opposite in direction to current flow in said encircling surface in response to said current in said coil and thereby produce a magnetic field to induce eddy currents in an object located in the aperture,
   f. and detecting and indicating means responsive to variations in said eddy currents for indicating variations in said objects.

2. Apparatus according to claim 1 in which said monoturn conductive member is designed and adapted for producing a flux density of the magnetic field in the region of said aperture with a given current in said coil which is substantially greater than the flux density which would be produced in said region in the absence of said monoturn conductive member.

3. Apparatus according to claim 1 in which the length of said aperture is small compared to the distance from the center of the aperture to said encircling surface.

4. Apparatus according to claim 1 in which the width of said encircling surface is greater than the length of said aperture and the length of said coil is greater than the length of the aperture.

5. Apparatus according to claim 1 in which said detecting and indicating means includes a single detector coil encircling a surface of said monoturn conductive member which encircles said aperture and is spaced therefrom.

6. Apparatus according to claim 1 in which said detecting and indicating means includes a pair of axially-spaced detector coils in or adjacent said aperture.

7. Eddy current testing apparatus for the nondestructive testing of objects which comprises
   a. a monoturn conductive member having an inner aperture for receiving an object to be tested and a surface encircling the aperture and spaced therefrom,
   b. the length of said aperture being small compared to the distance from the center of the aperture to said encircling surface, c. a slot in said member extending from said aperture to said encircling surface, d. a coil encircling said encircling surface for inducing current flow therein, e. means for supplying alternating or pulsed current to said coil, f. said monoturn conductive member being designed and adapted for producing current flow around the surface of said aperture opposite in direction to current flow in said encircling surface in response to said current in said coil and thereby produce a magnetic field to induce eddy currents in an object located in the aperture, g. and detecting and indicating means responsive to variations in said eddy currents for indicating variations in said objects.

8. Apparatus according to claim 7 in which said detecting and indicating means includes a pair of axially-spaced detector coils in or adjacent said aperture.

9. Apparatus according to claim 7 in which said detecting and indicating means includes a detector coil encircling a surface of said monoturn conductive member which encircles said aperture and is spaced therefrom.

10. Apparatus according to claim 7 in which the width of said encircling surface is greater than the length of said aperture and the length of said coil is greater than the length of the aperture.

11. Apparatus according to claim 10 in which said detecting and indicating means includes a pair of null connected axially-spaced detector coils in or adjacent said aperture.

12. Eddy current testing apparatus for the nondestructive testing of objects which comprises a. a pair of monoturn conductive members each having an inner aperture and a surface encircling the aperture and spaced therefrom, b. each of said members having a slot extending from said aperture to said encircling surface thereof, c. coil means encircling said encircling surfaces for inducing current flow therein, d. means for supplying alternating or pulsed current to said coil means to produce current flow around the surfaces of said apertures opposite in direction to current flow in said encircling surfaces respectively and thereby produce respective magnetic fields, e. whereby an object located in at least one of said apertures has eddy currents induced therein, f. and detecting and indicating means responsive to variations in said eddy currents for indicating variations in said objects.

13. Apparatus according to claim 12 for comparing different objects located in respective apertures of said monoturn members in which said detecting and indicating means including means for detecting differences between the eddy current flows in respective objects.

14. Apparatus according to claim 12 for comparing different objects located in respective apertures of said monoturn members in which said coil means includes separate coils encircling respective members, and said detecting and indicating means includes means responsive to differences between the currents flowing in said coils.

15. Apparatus according to claim 12 in which said detecting and indicating means includes a pair of detector coils encircling respective surfaces of said monoturn members which encircle respective apertures.

16. Apparatus according to claim 12 in which the length of said apertures is small compared to the distance from the centers of the apertures to said encircling surfaces, respectively.

17. Apparatus according to claim 12 in which said pair of monoturn members are spaced side by side with the aperture thereof in alignment for passage therethrough of an object to be tested.

18. Apparatus according to claim 17 in which said detecting and indicating means includes a pair of detector coils encircling respective surfaces of said monoturn members which encircle respective apertures.

19. Apparatus according to claim 18 in which the length of said apertures is small compared to the distance from the centers of the apertures to said encircling surfaces, respectively.

20. Eddy current testing apparatus for the nondestructive testing of objects which comprises a. a plurality of monoturn conductive members each having an inner aperture and a surface encircling the aperture and spaced therefrom, b. each of said members having a slot extending from said aperture to said encircling surface thereof, c. said members being spaced side by side with the apertures thereof in alignment for passage therethrough of an object to be tested, d. coils encircling said encircling surfaces, respectively, e. means for supplying alternating or pulsed current to the coil of at least one of said members to induce current flow in the encircling surface thereof and produce current flow in the opposite direction around the inner surface of the aperture thereof and induce eddy currents in a said object, f. and means for utilizing signals from the coil of at least another of said members to produce indications of variations in said objects.

21. Apparatus according to claim 20 in which said alternating or pulsed current is applied to the coils of a pair of alternate members in respective directions which produce current flow in opposite directions around the respective apertures, and signals from the coil of a member between said pair are utilized to produce said indications.

22. Apparatus according to claim 20 in which said alternating or pulsed current is applied to the coil of an intermediate member, and the coils of the members on each side of the intermediate member are connected in opposed relationship to produce the signals utilized to produce said indications.

* * * * *